United States Patent [19]
Merkler et al.

[11] Patent Number: 6,082,750
[45] Date of Patent: Jul. 4, 2000

[54] CLOSED JOINT LEAF SPRING MOUNTING ASSEMBLY

[75] Inventors: Michael B. Merkler; Mark N. Sanders; Vish N. Gurudutt, all of Fort Wayne; David C. Merriman, St. Joe, all of Ind.

[73] Assignee: Navistar International Transportation Corp, Chicago, Ill.

[21] Appl. No.: 09/021,931

[22] Filed: Feb. 11, 1998

[51] Int. Cl.[7] .......................... B60G 11/04; B60G 11/10; B60G 11/12; B60G 11/107; B60G 11/113
[52] U.S. Cl. ................... 280/124.175; 267/47; 267/260
[58] Field of Search ...................... 280/124.17, 124.171, 280/124.172, 124.173, 124.174, 124.175, 680, 686; 267/36.1, 38, 47, 260, 246, 39, 229

[56] References Cited

U.S. PATENT DOCUMENTS

| | | | |
|---|---|---|---|
| 1,013,774 | 1/1912 | Hodges | 267/260 |
| 2,361,166 | 10/1944 | Ayers | 280/686 |
| 2,772,891 | 12/1956 | Bonnin | 280/124.175 |
| 4,108,470 | 8/1978 | Vinton | 280/677 |
| 4,313,620 | 2/1982 | Posnikoff | 280/124.106 |
| 4,331,348 | 5/1982 | Raidel . | |
| 4,858,949 | 8/1989 | Wallace et al. . | |
| 4,988,080 | 1/1991 | Shah | 267/30 |
| 5,328,159 | 7/1994 | Kaufman et al. . | |
| 5,337,997 | 8/1994 | Hockney | 248/596 |
| 5,346,247 | 9/1994 | Snyder . | |
| 5,354,091 | 10/1994 | Baxter et al. | 280/683 |
| 5,427,404 | 6/1995 | Stephens . | |
| 5,921,570 | 7/1999 | Lie | 280/124.75 |

*Primary Examiner*—Brian L. Johnson
*Assistant Examiner*—Michael Britton
*Attorney, Agent, or Firm*—Jeffrey P. Calfa; Dennis Kelly Sullivan

[57] ABSTRACT

The closed joint leaf spring mounting assembly for a mobile vehicle with a body and at least two axles may have a suspension bracket configured to be permanently fixed upon an axle housing for enclosing one of the axles and to include a plurality of vertical throughbores therein, a leaf spring having conformed surface to be congruous with areas of the suspension bracket including the throughbores, and including vertical throughbores therein which align with and form a continuation of the throughbores in the bracket, and a plurality of connectors, such as cap screws, for engagement within the aligned throughbores of the spring end and bracket for securing the structures together.

8 Claims, 3 Drawing Sheets

CLOSED JOINT LEAF SPRING MOUNTING ASSEMBLY

BACKGROUND OF THE INVENTION

The invention relates generally to a vehicle suspension assembly. More particularly the invention relates to a closed joint leaf spring mounting assembly supported on an axle housing of the vehicle.

PRIOR ART

Heretofore various suspension systems and assemblies for use in heavy load vehicles such as trucks or buses have been proposed.

U.S. Pat. No. 5,427,404 discloses a light weight suspension system using a rigid beam connection at one end of a spring to engage the spring to a vehicle frame by a vertical link and such link allows the end freedom of movement in the vertical and lateral axes, the beam also connecting to the axle by means of U bolts.

U.S. Pat. No. 5,328,159 discloses a mounting assembly comprising a pair of cooperating brackets for securing an axle housing to a suspension system of a vehicle frame by means of U bolts.

U.S. Pat. No. 5,346,247 discloses an air suspension for a vehicle having a rear axle beneath the vehicle frame and includes an elongated gooseneck spring which is clamped to a seat of the rear axle at the center portion of the spring by U bolts.

U.S. Pat. No. 4,858,949 discloses a light weight trailing arm air suspension with the trailing arm being affixed to the axle by a pair of cushioned cooperating U-shaped clamping brackets in a manner permitting articulation therebetween, the brackets being engaged together about the axle by long clamping bolts.

U.S. Pat. No. 4,331,348 discloses a vehicle suspension assembly including leaf springs which are secured to an axle seat by vertically oriented pins extending through ends of the leaves underlying the seat.

The prior art assemblies utilizing U bolts or U-shaped clamping bracket pairs require an exact alignment of the parts to be joined together. Also, these assemblies create an open joint which decreases joint strength as it relates to laterally transferred loads. Further, these assemblies unnecessarily incorporate an axle housing therewithin.

SUMMARY OF THE INVENTION

Accordingly it is one object of the invention to provide a vehicle suspension mounting assembly which eliminates the need for an exact alignment between parts of the assembly during interconnection.

It is a further object of the invention to create an assembly which eliminates inclusion of the axle housing therewithin.

It is a further object of the invention to provide an assembly which creates a closed joint to increase joint strength.

These and other objects of the invention are met by the assembly proposed herein which comprises a bracket for securing the structures together.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
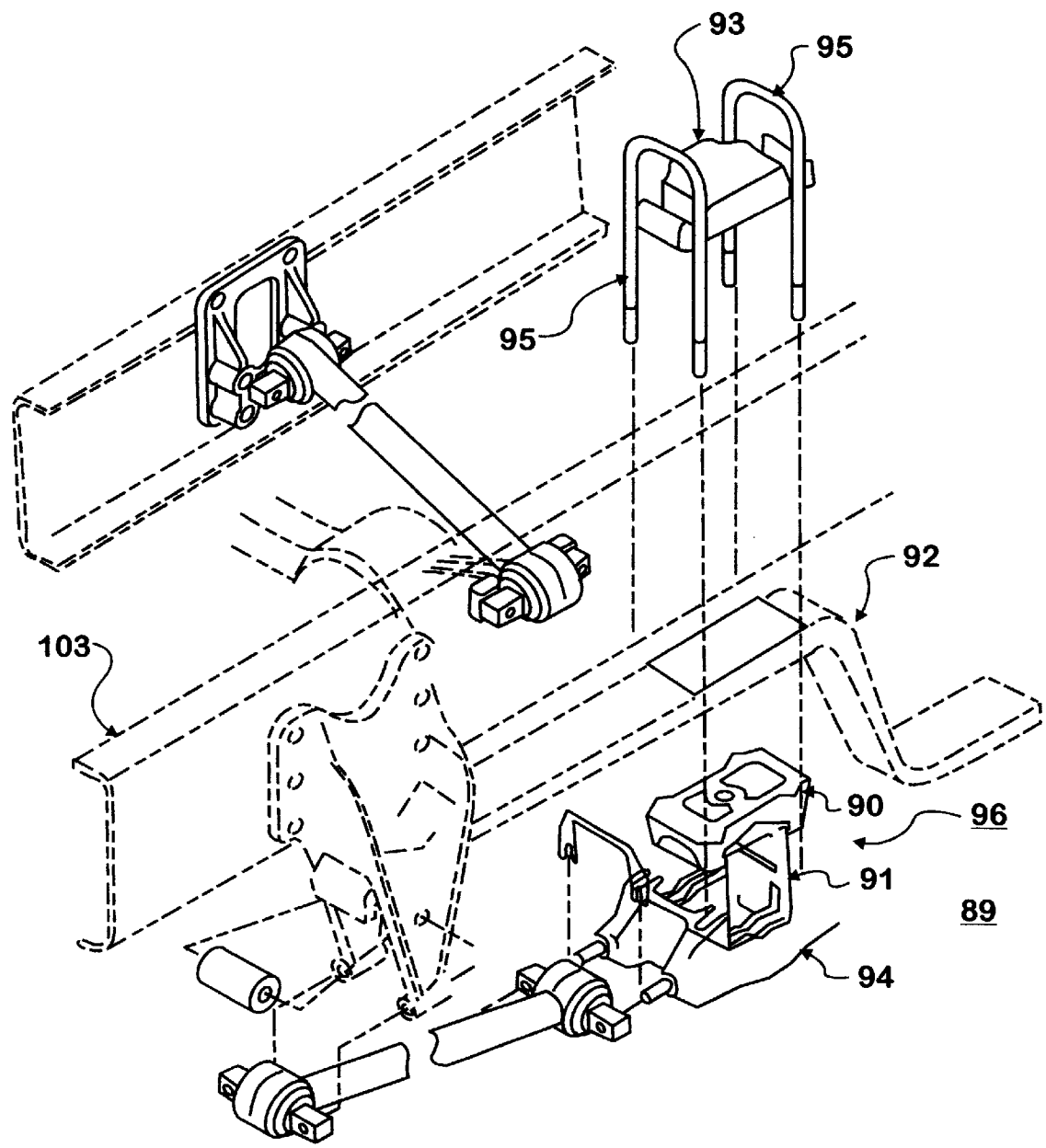
FIG. 1 is an exploded perspective view of a prior art leaf spring mounting assembly.

Referring now to the drawings in greater detail there is illustrated in FIG. 1 a typical prior art assembly 89 used to create a joint between a suspension spring 92 and an axle housing 91 of a heavy load mobile vehicle 101 (not shown), such as a medium or heavy duty truck. The vehicle has at least two axles 102 (not shown) and a body 103. The body 103 has leaf springs 92 for engagement to an axle housing 91 which encloses the axles 102 which are attached to wheels 104 (not shown).

As shown, a suspension bracket 90 engages over an axle housing 91 and serves as a seat for receiving a suspension spring 92 thereon. An upper U bolt bracket 93 is then placed over the suspension spring 92 and cooperates with a bottom U bolt bracket 94 positioned beneath the axle housing 91. The brackets 90, 93, and 94 are engaged together in known manner by at least one U bolt 95, creating an open joint 96 therebetween, with the joint formed in this manner serving to engage the axle housing 91 and suspension spring 92 together.

It will be understood that through creation of such a plurality of interfaces between the various engaged surfaces a soft or relatively loose joint 96 is formed and, by creation of an inherently open joint 96 as well, high loads in a direction transverse to the axis of the U bolts 95 (i.e., horizontal loads) are not well accommodated and can cause damage to the assembly at low tolerances. Further, it will be seen that the joint 96 unnecessarily incorporatesthe axle housing 91 enclosed therewithin.

Figure 2:
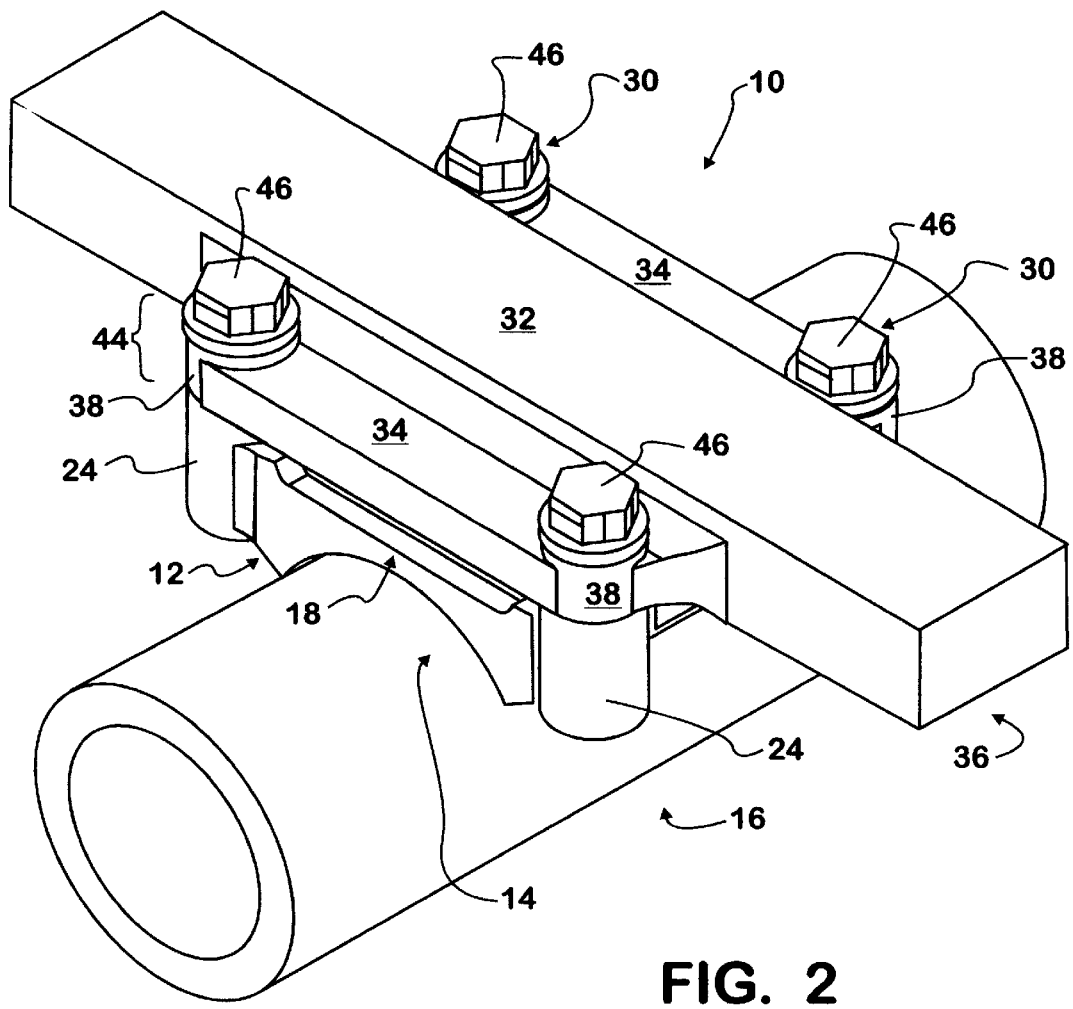
FIG. 2 is a perspective view of the closed joint leaf spring mounting assembly of the present invention engaged upon one embodiment of an axle housing.
Figure 3:
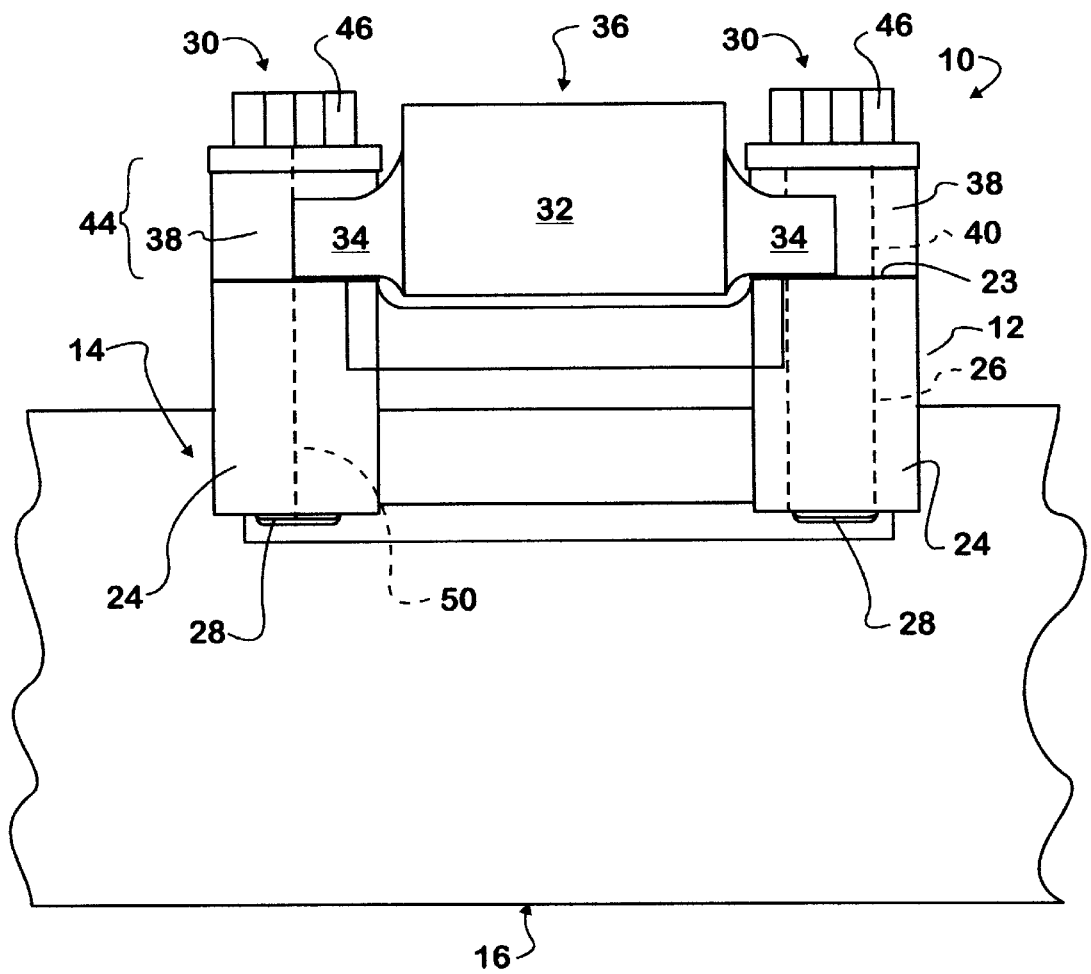
FIG. 3 is an end view of the assembly of FIG. 2.

Turning now to FIGS. 2 and 3, there is illustrated therein the closed joint leaf spring mounting assembly 10 made in accordance with the teachings of the present invention.

The mounting assembly 10 includes a suspension bracket 12 which spans and is permanently fixed to and upon an upwardly directed surface portion 14 of an axle housing 16, such as by welding. It will be understood that the axle housing 16 may be square or round in cross section and that a bottom peripheral edge 18 of the suspension bracket 12 is configured to accommodate the specific cross sectional configuration of the axle housing 16, in a manner to produce secure weldment of the bracket 12 to the axle housing 16 about the peripheral edge 18 of the suspension bracket 12. Put another way the suspension bracket 12 is configured to engage the axle housing 16 in a manner to be contiguous to the axle housing 16 therealong. The suspension bracket 12 in the alternative may be cast or manufactured integral to the axle housing 16.

The suspension bracket 12 has a substantially rectangular top surface 23 and includes at least four radially and vertically expanded, or turreted corners 24. Each of the turreted corners 24 is provided with a centered vertical, threaded bore 26, dimensioned to threadedly engage a threaded end 28 of a connector 30, such as a cap screw 30. The connector 30 could also take the form of a lock bolt with cooperating swaged collar (not shown), or could comprise any other suitable industry standard connector or fastener.

The suspension bracket 12 serves as a seat for accommodating engagement of a conformed surface 36 of a leaf spring 32 which includes a pair of conformed flanges 34 extending laterally thereof. In other words, the conformed flanges 34 of the leaf spring 32 are sized and configured to create a conformed surface 36 which conforms to the configuration of the top surface 23 of the bracket 12 in certain aspects for congruency there between at critical points.

In this respect, each conformed flange 34 also incorporates a pair of turreted peripheral corners 38 having centered throughbores 40 therein, each of the throughbores 40 overlying and forming a continuation of the threaded bore 26 provided in the corresponding turreted corner 24 of the suspension bracket 12. Once the conformed surface 36 of the leaf spring 32 is seated over and upon the suspension bracket 12, a connector 30 is threaded through each throughbore 40 of each conformed flange 34, and into threaded engagement with and within the corresponding underlying threaded bore 26 of the suspension bracket 12, with alignment between the leaf spring conformed flanges 34 and the suspension bracket 12 being brought about merely by engagement of the connectors 30 within the corresponding aligned pairs of threaded bore 26 and throughbores 40, respectively.

When cap screws 30 are used as connectors 30, each cap screw 30 may be engaged in a manner using the full torque potential thereof so that a stiffly clamped closed joint 44 is created via compression of the leaf spring 32 at the conformed surface 36 by a flanged head 46 of the cap screw 30, against the underlying suspension bracket 12. Because the conformed surface 36 is seated directly upon the suspension bracket 12, and is compressed directly there against by the flanged head 46 of the cap screw 30, the closed joint 44 is created using the mounting assembly 10 which is inherently more capable of accepting a load transverse to a rotational vertical axis 50 of the cap screw 30, such transverse load being a potentiality when dealing with transference of loads through a bearing surface. Still further, if a greater degree of fixation in the area of engagement is desired, an adhesive could be applied to at least the turreted corners 24 of the suspension bracket 12 prior to engagement of spring end 36 thereupon, further reinforcing the closed joint (at 44). The fact that the axle housing 16 is not enclosed in the closed joint 44, allows for a better engagement of the leaf spring 32 to the axle housing 16. The deletion of the need for U-bolts 95 additionally removes some of the play or movement in the mounting assembly 10 and makes for a tighter engagement between the axle housing 16 and the leaf spring 32 of the vehicle 101 than the prior art.

As described above, the mounting assembly 10 the present invention provides a number of advantages, some of which have been described above and others of which are inherent in the invention. Also modifications may be proposed to the mounting assembly 10 without departing from the teachings herein. Accordingly, the scope of the invention is only to be limited as necessitated by the accompanying claims.

We claim:

1. A combination of a closed joint leaf spring mounting assembly and an axle for a mobile vehicle with a body, comprising:

a suspension bracket permanently fixed to and supported by an axle housing;

said axle housing encloses an axle and has a cross sectional configuration;

a leaf spring for engagement to the body of the vehicle;

said leaf spring having a conformed surface to seat upon said suspension bracket;

a plurality of connectors for engaging said conformed surface of said leaf spring to said suspension bracket;

said suspension bracket has a substantially rectangular horizontal upper surface including four corners;

each of said corners includes a centered vertical threaded bore; and said conformed surface of said leaf spring includes a pair of lateral conformed flanges.

2. The mounting assembly of claim 1 wherein each of said conformed flanges has two peripheral corners.

3. The mounting assembly of claim 2 wherein said peripheral corners of each conformed flange aligns over a corresponding corner of said suspension bracket.

4. The mounting assembly of claim 3 wherein each said peripheral corner of each of said conformed flanges has a threaded vertical bore therein which aligns over and forms a continuation of a corresponding threaded bore in said suspension bracket.

5. The mounting assembly of claim 4 wherein said plurality of connectors are threaded.

6. The mounting assembly of claim 5 wherein said connectors comprise cap screws.

7. The mounting assembly of claim 6 wherein each said cap screw includes a flanged head.

8. The mounting assembly of claim 7 wherein each said cap screw is threadedly engaged through said aligned vertical bores to engage said conformed flanges of said leaf spring to said suspension bracket.

* * * * *